F. BARMES.
SHAFT BEARING.
APPLICATION FILED NOV. 13, 1918.
1,297,779.
Patented Mar. 18, 1919.
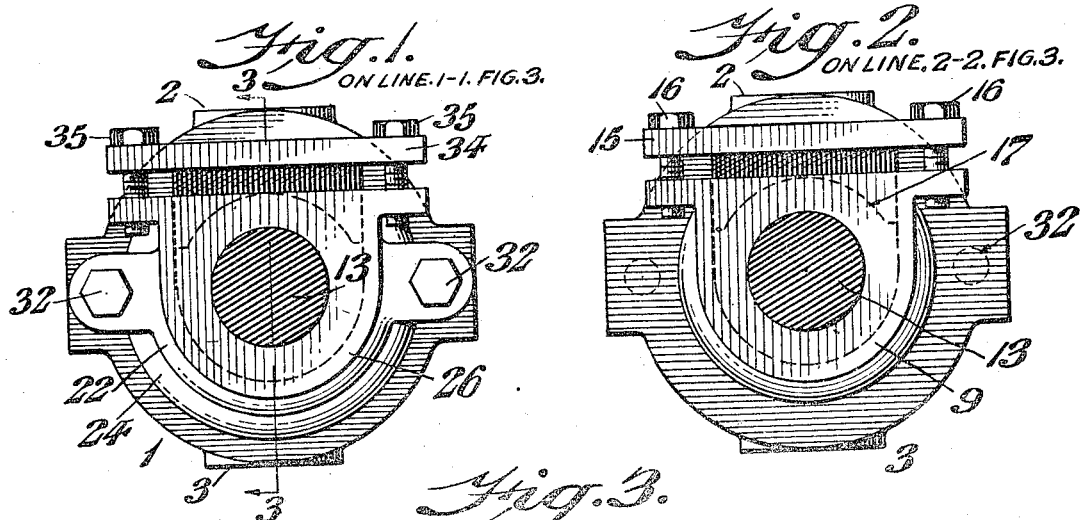
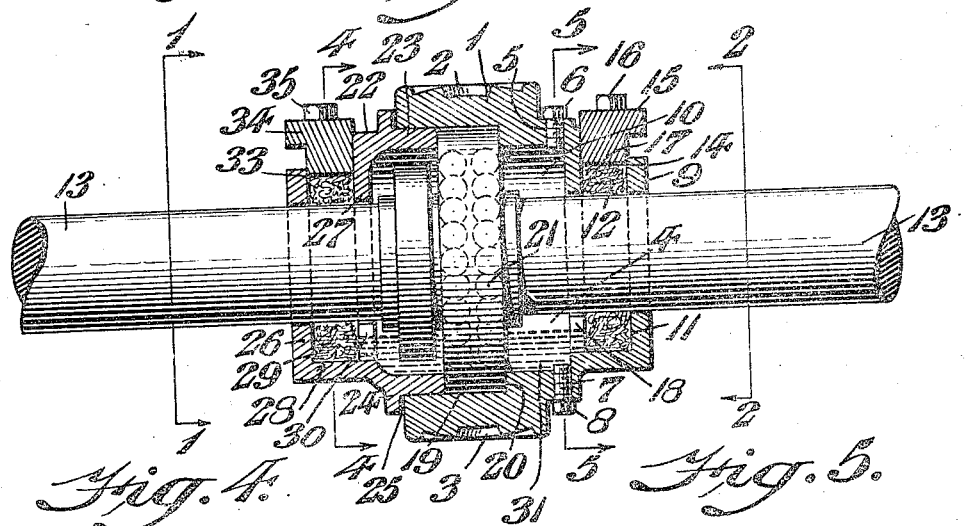
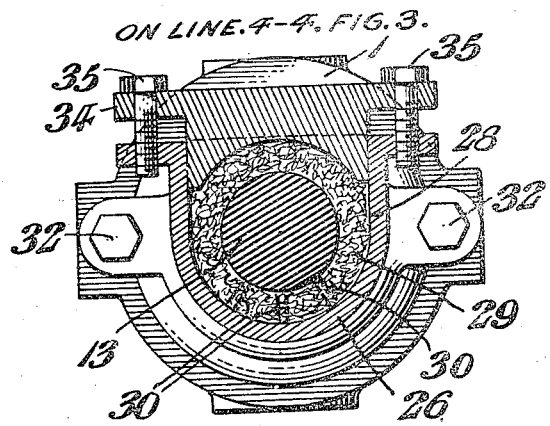
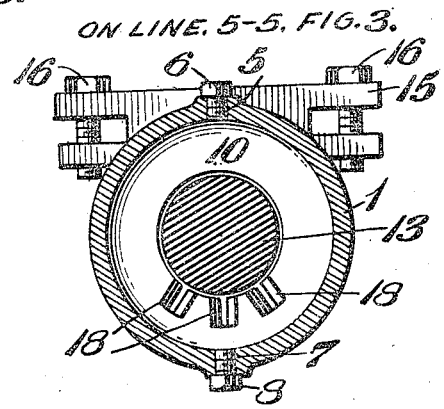
INVENTOR.
Frank Barmes.
BY
Niedersheim Fairbanks
ATTORNEYS.

UNITED STATES PATENT OFFICE.

FRANK BARMES, OF PHILADELPHIA, PENNSYLVANIA.

SHAFT-BEARING.

1,297,779. Specification of Letters Patent. Patented Mar. 18, 1919.

Application filed November 13, 1918. Serial No. 262,285.

*To all whom it may concern:*

Be it known that I, FRANK BARMES, a citizen of the United States, residing in the city and county of Philadelphia, State of Pennsylvania, have invented a new and useful Shaft-Bearing, of which the following is a specification.

In bearings for shafts as ordinarily constructed considerable difficulty has arisen in many cases due to the oil dropping from the shafting with consequent injury to the articles which are being manufactured.

My present invention is devised to overcome such defect in prior devices and to the above end comprehends a novel construction and arrangement of a self lubricating bearing which is preferably packed with asbestos, waste or other suitable material so that the shaft will be properly wiped during its revolution.

It further consists of a novel construction of a bearing wherein one end is removable so that the ball bearings can be readily inspected at any time and wherein a chamber is formed at each end of the bearing and provision is made for the lubricant to pass from said end chambers into a central chamber which contains the main portion of the lubricating material.

It further consists of novel means for tightening the packing against the shaft.

Other novel features of construction and advantage will hereinafter more clearly appear in the detailed description of my invention.

For the purpose of illustrating my invention I have shown in the accompanying drawings a typical embodiment of it which in practice will give satisfactory and reliable results. It is, however, to be understood that this embodiment is typical only and that the various instrumentalities of which my invention consists can be variously arranged and organized and that my invention is not limited to the precise arrangement and organization of these instrumentalities as herein set forth.

Figure 1 represents a section, on line 1—1 of Fig. 3, of a shaft bearing embodying my invention.

Fig. 2 represents a section on line 2—2 of Fig. 3.

Fig. 3 represents a section on line 3—3 of Fig. 1.

Fig. 4 represents a section on line 4—4 of Fig. 3.

Fig. 5 represents a section on line 5—5 of Fig. 3.

Similar numerals of reference indicate corresponding parts.

Referring to the drawings—

1 designates the body portion of a shaft bearing embodying my invention, said body portion being recessed as at 2 and 3 in order to adapt it to be retained in the conventional type of shaft hanger. The body portion 1 is provided with a chamber 4 into which lubricant is introduced through the aperture 5 which is closed by means of a plug 6. 7 designates a drainage aperture which is closed by means of a plug 8. The body portion 1 has integral with it an end plate 9 and spaced from this end plate is an inwardly extending flange 10 which is spaced from the plate 9 to form an end chamber 11 which is provided with suitable packing 12 which serves as a wiper for the shaft 13 it being understood from Fig. 3 that the end plate 9 and the inwardly extending annular flange 10 are apertured to receive the shaft 13.

The body portion 1 at one end is provided in its upper face with a slot 14 which is closed by means of a plate 15 which is retained in its adjusted position against the packing by means of cap screws 16. The plate 15 is provided with an extension adapted to pass into the slot 14 and the lower face of said extension is curved as at 17 to conform to the curvature of the shaft 13. The flange 10 has at its lower end a plurality of ports or slots 18 which open into the end chamber 11 and communicate with the lubricating chamber 4. It will be noted that the lower end of the end chamber 11 is located above the bottom of the chamber 4 and where the ports 18 open into the chamber 4 their side walls diverge so that any excess lubricant in the chamber 4 will drain back into the chamber 4. The body portion 1 is provided with a differential bore having its greatest diameter 19 opening through the end wall of the body portion and forming a shoulder 20 against which abuts a ball bearing 21 of any conventional type and connected with the shaft 13 in any desired or conventional manner.

22 designates a removable end portion which is provided with an annular extension 23 which fits within the diameter 19 of the body portion and abuts against the ball bearing 21. The end portion 22 is provided with an annular flange 24 and between this flange and the body portion a gasket 25 is employed. The end portion 22 is provided with an end plate 26 and with an inwardly extending flange 27 which is spaced from the end plate 26 and contributes with it to form an end lubricating chamber 28 in which is contained packing 29. The flange 27 and the end plate 26 are apertured to permit the shaft 13 to pass therethrough. The flange 27 is provided with ports or slots 30 constructed in a similar manner to the ports 18 and having the same function of permitting the excess oil to pass from the end chamber 28 into the chamber 4 in which is placed the main body of lubricant 31. The lubricant 31 is preferably of such height that it covers the lower balls of the ball bearing or antifriction device 21.

The end portion 26 is secured to the body portion 1 by means of set screws 32. The end portion 26 is provided at its top with a slot 33 which receives a closure 34 corresponding in construction with that of the plate or closure 15 and it is secured in position by means of cap screws 35.

In assembling my device, it is simply necessary to slide the body portion 1 onto the shaft 13 and then secure the end portion 26 in position by means of the cap screws 32. The lubricant is placed in the end chamber 4 and packing placed in the end lubricating chambers 11 and 28 the closures 15 and 34 are then secured in their adjusted position by means of the cap screws 16 and 35 respectively.

By the employment of my present invention the shaft 13 is properly wiped with the lubricant and any excessive lubricant flows back through the ports 18 and 30 into the main lubricating chamber 4.

It has been found in practice that when a self lubricating of this type has been employed there is no likelihood of the oil or other lubricant passing along the shafting or dripping therefrom and one filling of lubricant lasts for a number of months.

It will now be apparent that I have devised a novel and useful construction of a shaft bearing which embodies the features of advantage enumerated as desirable in the statement of the invention and the above description, and while I have in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention what I claim as new and desire to secure by Letters Patent, is:—

1. In a bearing of the character stated, a body portion having a main lubricant receiving chamber and provided with an end chamber separated therefrom and having at its lower end, ports communicating with said main lubricant receiving chamber, a removable end portion detachably connected to said body portion and contributing with said body portion to form the main lubricant receiving chamber, said end portion having an end chamber separated from the lubricant chamber of the body portion and provided with ports at its bottom communicating with such chamber, said body portion and end portion having an aperture therethrough to receive a shaft, packing in said end chambers, and an antifriction device carried by said shaft and located within said body portion.

2. In a bearing of the character stated, a body portion having a lubricant receiving chamber apertured to receive a shaft, having one end closed, and provided with an open side, and having spaced from said closed end an inwardly projecting flange to thereby form an end chamber, a shaft passing through said body portion, an antifriction device carried by said shaft within said body portion, a detachable end portion apertured to receive said shaft and extending into the open side of said body portion to retain said antifriction device in position, said detachable portion having an inwardly extending flange contributing to form an end chamber, said detachable end portion forming a closure for the lubricant receiving chamber and being apertured to receive a shaft, said flanges having ports communicating with said lubricant receiving chamber and with said end chambers, packing in said end chambers, and means to secure said body portion and detachable portion in assembled condition.

3. In a self lubricating bearing, a body portion adapted for the reception of a shaft hanger and provided with a centrally located lubricant receiving chamber and with an end chamber communicating therewith by ports at its bottom, the upper end of said end chamber being open, packing within said chamber, a closure for said open end engaging said packing, means to adjustably connect said closure with respect to said body portion, a detachable end portion having an end chamber communicating by ports with said lubricant receiving chamber, the upper end of said end chamber of said portion being open, packing in the last named end chamber, a closure for said last named end chamber, means to detachably connect said last named closure with said end portion, and means to secure said end portion to said body portion.

4. In a self lubricating bearing, a bearing member having a main lubricating chamber to receive a shaft and its antifriction device and provided at each end with end chambers having at their bottom ports communicating with said main lubricating chamber, packing in said end chamber, and adjustable means to tighten said packing.

FRANK BARMES.

Witnesses:
  E. HAYWARD FAIRBANKS,
  C. D. McVAY.